United States Patent
Kokin et al.

(10) Patent No.: US 8,476,435 B2
(45) Date of Patent: Jul. 2, 2013

(54) METHOD FOR PRODUCING FLUORINE-CONTAINING POLYETHER CARBOXYLIC ACID AMIDE

(75) Inventors: Keisuke Kokin, Ibaraki (JP); Seiichiro Murata, Ibaraki (JP); Hideki Abe, Ibaraki (JP); Yusuke Takahashi, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 83 days.

(21) Appl. No.: 13/265,356

(22) PCT Filed: Apr. 16, 2010

(86) PCT No.: PCT/JP2010/056803
§ 371 (c)(1),
(2), (4) Date: Oct. 20, 2011

(87) PCT Pub. No.: WO2010/122952
PCT Pub. Date: Oct. 28, 2010

(65) Prior Publication Data
US 2012/0041201 A1 Feb. 16, 2012

(30) Foreign Application Priority Data
Apr. 21, 2009 (JP) ................................ 2009-103036

(51) Int. Cl.
*C07D 239/02* (2006.01)
(52) U.S. Cl.
USPC .......................... 544/332; 546/309; 548/307.7
(58) Field of Classification Search
USPC .......................... 544/332; 546/309; 548/307.7
See application file for complete search history.

(56) References Cited

U.S. PATENT DOCUMENTS

| | | | | |
|---|---|---|---|---|
| 2,567,011 | A * | 9/1951 | Diesslin et al. | 560/227 |
| 3,547,995 | A * | 12/1970 | Bartlett | 564/201 |
| 3,810,874 | A | 5/1974 | Mitsch et al. | |
| 5,034,525 | A * | 7/1991 | Dekura | 428/835.8 |
| 6,083,600 | A | 7/2000 | Kasai et al. | |

FOREIGN PATENT DOCUMENTS

| | | |
|---|---|---|
| JP | 02-049096 | 2/1990 |
| JP | 10-176049 | 6/1998 |
| JP | 10-259173 | 9/1998 |
| JP | 2004-346318 | 12/2004 |
| JP | 2008-266462 | 11/2008 |

OTHER PUBLICATIONS

International Search Report from corresponding PCT application No. PCT/JP2010/056803 dated Jul. 6, 2010, 4 pgs.
International Preliminary Report on Patentability and Written Opinion from corresponding PCT application No. PCT/JP2010/056803 dated Dec. 1, 2011 (6 pgs).

* cited by examiner

*Primary Examiner* — Yong Chu
*Assistant Examiner* — Valerie Rodriguez-Garcia
(74) *Attorney, Agent, or Firm* — Brinks Hofer Gilson & Lione

(57) ABSTRACT

A fluorine-containing polyether carboxylic acid amide represented by the general formula: $C_nF_{2n+1}O(C_3F_6O)_m$Rf-CONHAr, wherein Rf is a fluorocarbon group having 1 to 2 carbon atoms, Ar is a nitrogen-containing heterocyclic group, n is an integer of 1 to 3, and m is an integer of 10 to 30, is produced by reacting a fluorine-containing polyether carboxylic acid fluoride represented by the general formula: $C_nF_{2n+1}(C_3F_6O)_m$RfCOF, wherein Rf, n, and m are as defined above, with a nitrogen-containing heterocyclic amine compound represented by the general formula: $ArNH_2$, wherein Ar is as defined above; wherein the reaction is carried out while a reaction temperature is first increased to 80 to 100° C., and then increased at a temperature increase rate that produces a temperature difference of 3 to 5° C. after 48 hours.

8 Claims, No Drawings

METHOD FOR PRODUCING FLUORINE-CONTAINING POLYETHER CARBOXYLIC ACID AMIDE

RELATED APPLICATION

This application is a 35 U.S.C. §371 national phase filing of International Patent Application No. PCT/JP2010/056803, filed April 16, 2010, through which and to which priority is claimed under 35 U.S.C. §119 to Japanese Patent Application No. 2009-103036, filed Apr. 21, 2009.

TECHNICAL FIELD

The present invention relates to a method for producing a fluorine-containing polyether carboxylic acid amide. More particularly, the present invention relates to a method for producing a fluorine-containing polyether carboxylic acid amide whose end group is modified with a compound having a nitrogen atom.

BACKGROUND ART

Fluorine-containing compounds having a fluorine atom in the molecule are excellent in thermal stability and chemical stability, and those that are partially modified with other functional groups are used as additives for lubricating oil, etc. Among such fluorine-containing compounds, those whose end group is modified with a compound having a nitrogen atom have moderate coordination ability, because they contain a nitrogen atom that has a conjugated electron pairs in the molecular structure. Therefore, they are excellent in absorption to metal surfaces, and are considered to exhibit excellent performance as lubricating oil additives.

As an example of such additives, Patent Document 1 proposes a lubricant for magnetic disks, the lubricant comprising a stabilized compound having repeating units —$(CF_2)_n$O— and an end group —$CH_2NRR'$. However, the production of the compound necessitates methanesulfonyl chloride, which is expensive, and requires specific reaction procedures (e.g., reactions under anhydrous conditions). For these reasons, it is difficult to scale-up the production.

Moreover, Patent Document 2 proposes a fluorine-containing compound having a pyridine ring. The production method thereof is very simple, that is, a pyridine derivative and a fluorine-containing alcohol are only mixed in the presence of a phase-transfer catalyst. However, to obtain the fluorine-containing alcohol used in the reaction, esterification reaction of the corresponding acid fluoride and reduction reaction are generally required, as described in Patent Document 3. This suggests that the method includes many steps.

Furthermore, Patent Document 4 discloses a method for producing a fluorine-containing polyether carboxylic acid amide by reacting a fluorine-containing polyether carboxylic acid chloride and an aromatic amine. For the carboxylic acid chloride used in this reaction, it is necessary to convert the corresponding carboxylic acid fluoride to a carboxylic acid by hydrolysis, and then reconvert the carboxylic acid to a carboxylic acid chloride using thionyl chloride or phosphorus pentachloride. Such many reaction steps are disadvantageous in the actual production. In addition, since the reaction temperature is maintained at 5° C. or less, the reaction conversion decreases, and the yield is as low as about 75 to 85%.

PRIOR ART DOCUMENT

Patent Document

Patent Document 1: U.S. Pat. No. 6,083,600
Patent Document 2: JP-A-2004-346318
Patent Document 3: U.S. Pat. No. 3,810,874
Patent Document 4: JP-A-2-49096

OUTLINE OF THE INVENTION

Problem to Be Solved By the Invention

An object of the present invention is to provide a method for producing a fluorine-containing polyether carboxylic acid amide in which one molecular end is a chemically inert perfluoroalkyl group, and the other molecular end is modified with a heterocyclic group having a nitrogen atom.

Means for Solving the Problem

The above object of the present invention can be achieved by a method for producing a fluorine-containing polyether carboxylic acid amide represented by the general formula:

$$C_nF_{2n+1}O(C_3F_6O)_mRfCONHAr \quad [I]$$

wherein Rf is a fluorocarbon group having 1 to 2 carbon atoms, Ar is a nitrogen-containing heterocyclic group, n is an integer of 1 to 3, and m is an integer of 10 to 30, the method comprising reacting a fluorine-containing polyether carboxylic acid fluoride represented by the general formula:

$$C_nF_{2n+1}O(C_3F_6O)_mRfCOF \quad [II]$$

wherein Rf, n, and m are as defined above, with a nitrogen-containing heterocyclic amine compound represented by the general formula:

$$ArNH_2$$

wherein Ar is as defined above; wherein the reaction is carried out while a reaction temperature is first increased to 80 to 100° C., and then increased at a temperature increase rate that produces a temperature difference of 3 to 5° C. after 48 hours.

EFFECT OF THE INVENTION

According to the method of the present invention, a fluorine-containing polyether carboxylic acid amide in which one molecular end is a chemically inert perfluoroalkyl group, and the other molecular end is modified with a heterocyclic group having a nitrogen atom, can be easily produced with a good yield by subjecting a specific fluorine-containing polyether carboxylic acid fluoride and nitrogen-containing heterocyclic amine compound to an amidation reaction. The obtained fluorine-containing polyether carboxylic acid amide has no coloring and can be effectively used as an additive for lubricants, etc.

Embodiments For Carrying Out The Invention

The fluorine-containing polyether carboxylic acid fluoride, which is used in the production of the fluorine-containing compound in which one molecular end is a chemically inert perfluoroalkyl group, and the other molecular end is modified with a heterocyclic group having a nitrogen atom, is represented by the general formula:

$$C_nF_{2n+1}O(C_3F_6O)_mRfCOF \quad [II]$$

The compound [II] can be easily obtained by a known method. Generally, hexafluoropropylene oxide is subjected to oligomerization in the presence of a cesium fluoride catalyst and a tetraglyme solvent, thereby obtaining a perfluoropolyether carboxylic acid fluoride represented by the general formula [IV].

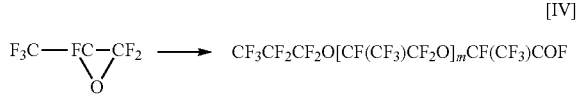

In terms of ease of preparation, the number average degree of polymerization (m) of the hexafluoropropylene oxide is preferably about $10 \leq m \leq 30$, more preferably about $m=20$. Moreover, the degree of polymerization may be distributed to some extent. The fluorine-containing polyether carboxylic acid fluoride can be most efficiently obtained by a production method using the hexafluoropropylene oxide oligomer.

Another method of producing a perfluoropolyether carboxylic acid fluoride having no branched structure is such that tetrafluorooxetane is subjected to ring-opening polymerization using metal fluoride, and the hydrocarbon methylene group of the repeating unit is then fluorinated by direct fluorination, thereby obtaining a perfluoropolyether carboxylic acid fluoride represented by the general formula [V]. However, this method has a long process.

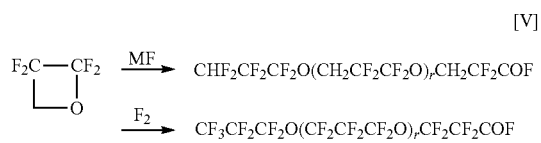

As shown in the above examples, the fluorocarbon group Rf is a perfluoroalkylene group or branched perfluoroalkylene group having 1 to 2 carbon atoms. Examples thereof include —$CF_2$—, —$CF_2CF_2$—, —$CF(CF_3)$—.

Examples of the nitrogen-containing heterocyclic amino compound of the general formula: $ArNH_2$ [III], which is used for the modification of the perfluoropolyether carboxylic acid fluoride [II], include the following compounds. These nitrogen-containing heterocyclic amino compounds may have at least one substituted alkyl group, halogen group, or the like.
(1) Pyridine derivatives
    e.g., 2-, 3-, or 4-aminopyridine
(2) Pyrimidine derivatives
    e.g., 2-aminopyrimidine and 2-amino-4,6-dimethylpyrimidine
(3) Benzimidazole derivatives
    e.g., 2-aminobenzimidazole The fluorine-containing polyether carboxylic acid fluoride and nitrogen-containing heterocyclic amine compound can be reacted by stirring under heating to thereby obtain the target fluorine-containing compound. In the reaction, it is preferable to add a tertiary amine (an HF scavenger), which is not contributed in the main reaction, to capture HF produced by the reaction. In terms of ease of removal after reaction, trialkylamine (the number of carbon atoms in the alkyl group is 1 to 12, preferably 1 to 3), pyridine, dimethylaminopyridine, and other pyridines that do not have free amino groups (—$NH_2$), are preferably used. In terms of reactivity, ease of handling, cost, etc., in addition to the ease of removal after reaction, triethylamine and pyridine are more preferably used.

The target product can be obtained without particularly using a solvent in the reaction; however, when stirring is difficult because of, for example, the viscosity of perfluoropolyether, an organic solvent can be used to reduce the viscosity. As the organic solvent, a fluorine-based organic solvent, such as hydrochlorofluorocarbon, hydrofluorocarbon, or hydrofluoroether, is preferably used in view of the solubility of each reaction component, etc. Practically, AK-225 (produced by Asahi Glass Co., Ltd.), Novec HFE (produced by 3M), and other commercial products can be used.

The reaction temperature is first set to about 80 to 100° C., preferably about 90 to 100° C., after the nitrogen-containing heterocyclic amine compound and HF scavenger are added dropwise to the fluorine-containing polyether carboxylic acid fluoride. During the reaction, oxidization of the amine compound may cause remarkable coloring of the reaction mixture. In order to avoid this phenomenon, the reaction temperature is gradually increased after the dropwise addition is completed. More specifically, the reaction is carried out while the reaction temperature is first increased to about 80 to 100° C., and then increased at a temperature increase rate that produces a temperature difference of 3 to 5° C. after 48 hours. After the reaction temperature is increased, the reaction is continued at this reaction temperature until the —COF signal disappears (absorption at 1,880 to 1,885 cm$^{-1}$ in the IR spectrum). Moreover, an unnecessarily long reaction time causes coloring; therefore, the reaction time after the temperature is increased is set to about 24 to 100 hours, preferably about 48 to 72 hours.

After the reaction, amine-HF salts etc., which are produced during the reaction, are removed by an extraction treatment. When no solvent is used in the reaction, a fluorine-based organic solvent is used as an extraction solvent. As the fluorine-based organic solvent, the above-mentioned commercial products can be used as they are. As the extraction solvent for dissolving water-soluble substances in the reaction mixture, water, saline, lower alcohol, or the like can be used; among these, methanol is preferably used, in terms of the ability to extract impurities and the phase-separation ability.

EXAMPLES

The following describes the present invention with reference to Examples.

Example 1

In a flask equipped with a T-shaped connector for nitrogen sealing, a stirring blade, a condenser, a dropping funnel, a thermometer, and a mantle heater for heating, 1,020 g of perfluoropolyether carboxylic acid fluoride of the formula:

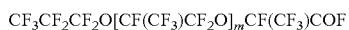

m: 12 (the number average polymerization degree of hexafluoropropylene oxide determined by F-NMR; distributed to some extent) was charged and stirred. A mixture of 51 g (372 mmol) of 2-aminobenzimidazole and 9 g (89 mmol) of triethylamine was slowly added dropwise thereto at room temperature. The temperature of the mantle heater was adjusted so that the internal temperature after completion of the dropwise addition was 92±1° C., and further adjusted so that the internal temperature after 48 hours was 96±1° C. Then, stirring under heating was further carried out for 24 hours. After the disappearance of the COF signal at 1,885 cm$^{-1}$ was confirmed by the IR spectrum, 250 mL of fluorine-based organic solvent (AK-225, produced by Asahi Glass Co., Ltd.) was added to the reaction mixture and sufficiently dissolved by stirring. Thereafter, insoluble components, such as amine-hydrofluoric acid salt, were removed by a membrane filter.

To the filtrate, 100 mL of the same fluorine-based organic-solvent (AK-225) and 1,200 g of methanol were added, and the mixture was sufficiently mixed. The operation of extracting the lower layer was performed three times in total. Finally, the fluorine-based organic solvent (AK-225) was removed using an evaporator under reduced pressure, thereby obtaining 1,050 g (yield: 98.1%) of the following uncolored fluorine-containing compound.

F-NMR (acetone-d6, CFCl$_3$)
−145.9 to −145.2 ppm; —OCF(CF$_3$)CF$_2$O—
−132.6 ppm; —CF(CF$_3$)CON$\overline{H}$—
−131.0 ppm; CF$_3$$\overline{C}$F$_2$CF$_2$O—
−86.1 to −74.9 p$\overline{\underline{p}}$m; —OCF(CF$_3$)C$\underline{F}_2$O—, CF$_3$CF$_2$C$\underline{F}_2$O—
−8$\overline{4}$.1 ppm; CF$_3$CF$_2$CF$_2$O—
−81.3 ppm; —$\overline{O}$CF(CF$_3$)CF$_2$O—
−81.2 ppm; —CF(CF$_3$)CONH—
H-NMR (acetone-d$\overline{6}$, TMS)
δ7.20; =N—C=CH—CH=
δδ7.61; =N—C=C$\overline{H}$—CH=

Example 2

In Example 1, as the perfluoropolyether carboxylic acid fluoride, 500 g of one of the formula:

CF$_3$CF$_2$CF$_2$O(CF$_2$CF$_2$CF$_2$O)$_m$CF$_2$CF$_2$COF m: 20 (the number average polymerization degree of hexafluoropropylene oxide determined by F-NMR; distributed to some extent)

was used, and the amounts of 2-aminobenzimidazole and triethylamine were changed to 18.8 g (137 mmol) and 3.3 g (33 mmol), respectively. Then, stirring under heating was similarly carried out. After the disappearance of the COF signal at 1,880 cm$^{-1}$ was confirmed by the IR spectrum, 100 mL of fluorine-based organic-solvent (AK-225) was added to the reaction mixture and sufficiently dissolved by stirring. Thereafter, insoluble components, such as amine-hydrofluoric acid salt, were removed by a membrane filter.

To the filtrate, 100 mL of the same fluorine-based organic-solvent (AK-225) and 600 g of methanol were added, and the mixture was sufficiently mixed. The operation of extracting the lower layer was performed three times in total. Finally, the fluorine-based organic solvent (AK-225) was removed using an evaporator under reduced pressure, thereby obtaining 482 g (yield: 93.5%) of the following uncolored fluorine-containing compound.

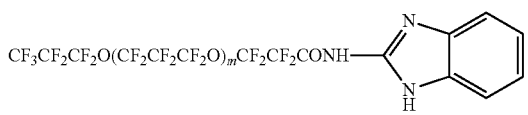

F-NMR (acetone-d6, CFCl$_3$)
−125.6 ppm; CF$_3$$\underline{C}$F$_2$CF$_2$O—
−122.8 ppm; —CF$_2$$\overline{C}$F$_2$CF$_2$O—
−113.4 ppm; —OCF$_2$$\underline{C}$F$_2$CONH—
−88.4 to −88.7 ppm; —$\overline{O}$CF$_2$—
−88.2 ppm; CF$_3$CF$_2$CF$_2$O$\overline{\underline{\ }}$
H-NMR (acetone-d6, TMS)
δ7.20; =N—C=CH—CH=
δ7.61; =N—C=C$\overline{H}$—CH=

Example 3

In Example 1, 35 g (372 mmol) of 4-aminopyridine was used in place of the 2-aminobenzimidazole, the internal temperature after completion of the dropwise addition was changed to 90±1° C., and the internal temperature after 48 hours was changed to 95±1° C. As a result, 998 g (yield: 94.8%) of the following uncolored fluorine-containing compound was obtained.

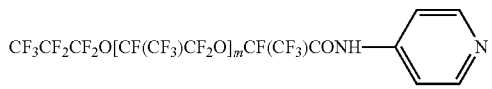

m: 12 (the number average polymerization degree of hexafluoropropylene oxide determined by F-NMR; distributed to some extent)
F-NMR (acetone-d6, CFCl$_3$)
−146.0 to −145.1 ppm; —OCF(CF$_3$)CF$_2$O—
−132.8 ppm; —CF(CF$_3$)CON$\overline{H}$—
−131.2 ppm; CF$_3$$\overline{C}$F$_2$CF$_2$O—
−86.0 to −74.6 p$\overline{\underline{p}}$m; —OCF(CF$_3$)C$\underline{F}_2$O—,CF$_3$CF$_2$C$\underline{F}_2$O—
−8$\overline{4}$.1 ppm; CF$_3$CF$_2$CF$_2$O—
−81.3 ppm; —$\overline{O}$CF(CF$_3$)CF$_2$O—
−81.2 ppm; —CF(CF$_3$)CONH—
H-NMR (acetone-d$\overline{6}$, TMS)
δ6.50; —C=CH—CH=N—
δ8.01; —C=C$\overline{H}$—CH=N—

Example 4

In Example 1, 35.3 g (372 mmol) of 2-aminopyrimidine was used in place of the 2-aminobenzimidazole, the internal temperature after completion of the dropwise addition was changed to 90±1° C., and the internal temperature after 48 hours was changed to 95±1° C. As a result, 1,032 g (yield: 98.0%) of the following uncolored fluorine-containing compound was obtained.

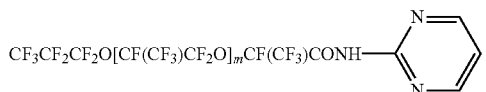

m: 12 (the number average polymerization degree of hexafluoropropylene oxide determined by F-NMR; distributed to some extent)
F-NMR (acetone-d6, CFCl$_3$)
−146.2 to −145.1 ppm; —OCF(CF$_3$)CF$_2$O—
−132.8 ppm; —CF(CF$_3$)CON$\overline{H}$—
−131.2 ppm; CF$_3$$\overline{C}$F$_2$CF$_2$O—
−85.9 to −74.5 p$\overline{\underline{p}}$m; —OCF(CF$_3$)C$\underline{F}_2$O—,CF$_3$CF$_2$C$\underline{F}_2$O—
−8$\overline{4}$.0 ppm; CF$_3$CF$_2$CF$_2$O—
−81.2 ppm; —$\overline{O}$CF(CF$_3$)CF$_2$O—
−81.1 ppm; —CF(CF$_3$)CONH—
-H-NMR (acetone-d$\overline{6}$, TMS)
δ7.35; —CH=CH—CH=
δ8.76; —CH=C$\overline{H}$—CH=

Example 5

In Example 2, 12.9 g (137 mmol) of 4-aminopyridine was used in place of the 2-aminobenzimidazole, the internal temperature after completion of the dropwise addition was changed to 90±1° C., the internal temperature after 48 hours was changed to 95±1° C., and the amount of fluorine-based solvent (AK-225) used to dissolve the reaction mixture was changed to 120 mL. As a result, 502 g (yield: 98.4%) of the following uncolored fluorine-containing compound was obtained.

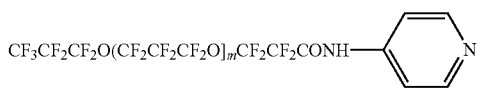

m: 20 (the number average polymerization degree of hexafluoropropylene oxide determined by F-NMR; distributed to some extent)
F-NMR (acetone-d6, CFCl$_3$)
−125.6 ppm; $CF_3\underline{C}F_2CF_2O$—
−122.8 ppm; —$C\underline{F_2}CF_2CF_2O$—
−113.4 ppm; —$OCF_2\underline{C}F_2CONH$—
−88.4 to −88.7 ppm; —$\overline{O}CF_2$—
−88.2 ppm; $CF_3CF_2CF_2\underline{O}$—
H-NMR (acetone-d6, TMS)
−δ6.51; —C=CH—CCH=N
−δ8.03; —C=C$\overline{H}$—CH=N—

Example 6

In Example 2, 13.0 g (137 mmol) of 2-aminopyrimidine was used in place of the 2-aminobenzimidazole, the internal temperature after completion of the dropwise addition was changed to 90±1° C., the internal temperature after 48 hours was changed to 95±1° C., and the amount of fluorine-based solvent (AK-225) used to dissolve the reaction mixture was changed to 120 mL. As a result, 498 g (yield: 97.5%) of the following uncolored fluorine-containing compound was obtained.

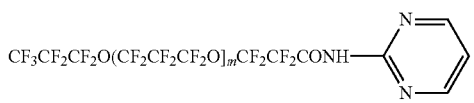

m: 20 (the number average polymerization degree of hexafluoropropylene oxide determined by F-NMR; distributed to some extent)
F-NMR (acetone-d6, CFCl$_3$)
−125.6 ppm; $CF_3\underline{C}F_2CF_2O$—
−122.8 ppm; —$C\underline{F_2}CF_2CF_2O$—
−113.5 ppm; —$OCF_2\underline{C}F_2CONH$—
−88.4 to −88.8 ppm; —$\overline{O}CF_2$—
−88.3 ppm; $CF_3CF_2CF_2\underline{O}$—
H-NMR (acetone-d6, TMS)
δ7.35; —CH=CH—CH=
δ8.76; —CH=C$\overline{H}$——CH=

Comparative Example

In a flask equipped with a T-shaped connector for nitrogen sealing, a stirring blade, a condenser, a dropping funnel, a thermometer, and a mantle heater for heating, 1,000 g of perfluoropolyether carboxylic acid fluoride of the formula:

$$CF_3CF_2CF_2O[CF(CF_3)CF_2O]_mCF(CF_3)COF$$

m: 12 (the number average polymerization degree of hexafluoropropylene oxide determined by F-NMR; distributed to some extent)

was charged and stirred. A mixture of 51 g (372 mmol) of 2-aminobenzimidazole and 9 g (89 mmol) of triethylamine was slowly added dropwise thereto at room temperature. After the dropwise addition was completed, stirring was carried out at room temperature for 48 hours. At this time, the COF signal at 1,885 cm$^{-1}$ was confirmed by the IR spectrum; therefore, the internal temperature was increased to 90° C., and stirring under heating was carried out for 24 hours. After the disappearance of the signal was confirmed by the IR spectrum, stirring under heating was stopped. To the reaction mixture, 250 mL of fluorine-based organic solvent (AK-225, produced by Asahi Glass Co., Ltd.) was added and sufficiently dissolved by stirring. Thereafter, insoluble components, such as amine-hydrofluoric acid salt, were removed by a membrane filter.

To the filtrate, 100 mL of the same fluorine-based organic solvent (AK-225) and 1,200 g of methanol were added, and the mixture was sufficiently mixed. The operation of extracting the lower layer was performed three times in total. Finally, the fluorine-based organic solvent (AK-225) was removed using an evaporator under reduced pressure, thereby obtaining the fluorine-containing compound (recovered amount: 1,020 g). NMR data of the obtained fluorine-containing compound was the same as that obtained in Example 1; however, the compound was significantly colored dark brown.

The invention claimed is:

1. A method for producing a fluorine-containing polyether carboxylic acid amide represented by the formula:

$$C_nF_{2n+1}O(C_3F_6O)_mRfCONHAr \qquad [I]$$

wherein Rf is a fluorocarbon group of 1 to 2 carbon atoms, Ar is a nitrogen-containing heterocyclic group, n is an integer of 1 to 3, and m is an integer of 10 to 30, the method comprising reacting a fluorine-containing polyether carboxylic acid fluoride represented by the formula:

$$C_nF_{2n+1}O(C_3F_6O)_mRfCOF \qquad [II]$$

wherein Rf, n, and m are as defined above, with a nitrogen-containing heterocyclic amine compound represented by the formula:

$$ArNH_2 \qquad [III]$$

wherein Ar is as defined above; wherein the reaction is carried out while a reaction temperature is first increased to 80 to 100° C., and then increased at a temperature increase rate that produces a temperature difference of 3 to 5° C. after 48 hours.

2. The method for producing a fluorine-containing polyether carboxylic acid amide according to claim 1, wherein the reaction temperature is set to 80 to 100° C. after a mixture of the nitrogen-containing heterocyclic amine compound and an HF scavenger is added dropwise to the fluorine-containing polyether carboxylic acid fluoride.

3. The method for producing a fluorine-containing polyether carboxylic acid amide according to claim 2, wherein the temperature after completion of the dropwise addition is set to 90 to 100° C.

4. The method for producing a fluorine-containing polyether carboxylic acid amide according to claim 1, wherein after the reaction temperature is increased, the reaction is continued at this reaction temperature until a—COF signal disappears.

5. The method for producing a fluorine-containing polyether carboxylic acid amide according to claim 1, wherein the nitrogen-containing heterocyclic amine compound of formula $ArNH_2$ is represented by one of the formulae:

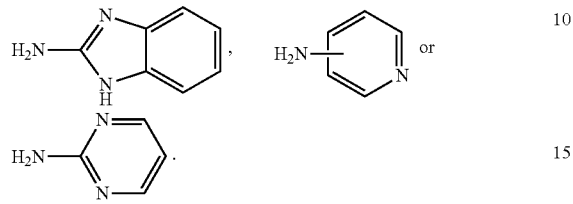

6. The method for producing a fluorine-containing polyether carboxylic acid amide according to claim 1, wherein a tertiary amine is added to the reaction of the fluorine-containing polyether carboxylic acid fluoride with the nitrogen-containing heterocyclic amine compound.

7. The method for producing a fluorine-containing polyether carboxylic acid amide according to claim 6, wherein the tertiary amine is trialkylamine or pyridine.

8. The method for producing a fluorine-containing polyether carboxylic acid amide according to claim 1, wherein a fluorine-based solvent is used in the reaction of the fluorine-containing polyether carboxylic acid fluoride with the nitrogen-containing heterocyclic amine compound.

* * * * *